350-406 SR

XR 3,728,643

United States Patent

Chu

[11] 3,728,643

[45] Apr. 17, 1973

[54] APPARATUS FOR TRANSFORMING NONORTHOGONAL ELLIPTICALLY POLARIZED WAVES INTO ORTHOGONAL LINEARLY POLARIZED WAVES

[75] Inventor: Ta-Shing Chu, Lincroft, N.J.

[73] Assignee: Bell Telephone Laboratories, Incorporated, Murray Hill, Berkeley Heights, N.J.

[22] Filed: Nov. 1, 1971

[21] Appl. No.: 194,361

[52] U.S. Cl. ....333/21 A, 333/31 A, 333/81 B

[51] Int. Cl. ....H01p 1/16, H01p 1/18

[58] Field of Search ....333/21, 21 A, 1, 333/6, 31 A, 31 R, 81 A

[56] References Cited

UNITED STATES PATENTS 2,948,865 8/1960 Smith ....333/21

OTHER PUBLICATIONS

Schelkunoff "Electromagnetic Waves" D. Van Nostrand New York copyright 1943 QC661 S3; pp. 248–249.

*Primary Examiner*—Herman Karl Saalbach
*Assistant Examiner*—Marvin Nussbaum
*Attorney*—R. J. Guenther et al.

[57] ABSTRACT

Apparatus for transforming first and second nonorthogonal elliptically polarized waves into orthogonal linearly polarized waves is disclosed. Linearization of the elliptical waves is achieved by applying a phase shift along at least one of two orthogonal directions, the latter directions being those for which the components of the first wave therealong and the components of the second wave therealong have the same phase difference. The resultant linear waves are then orthogonalized by applying attenuation along an appropriate direction.

13 Claims, 3 Drawing Figures

3728643
OR IN 333/21A

APPARATUS FOR TRANSFORMING NONORTHOGONAL ELLIPTICALLY POLARIZED WAVES INTO ORTHOGONAL LINEARLY POLARIZED WAVES

BACKGROUND OF THE INVENTION

This invention pertains to electromagnetic wave polarization control devices and, in particular to polarization control devices which can simultaneously transform nonorthogonal elliptically polarized waves into orthogonal linearly polarized waves.

As is well knwon, in transmitting linearly polarized electromagnetic wave energy, disturbances within the transmission medium tend to convert the linearly polarized waves into elliptically polarized waves having arbitrary orientations. Thus, for example, where there are excessive bends within a particular waveguide, linearly polarized waves passing therethrough will be transformed to elliptically polarized energy. Such polarization transformation also occurs during the transmission of wave energy between the satellite and ground station in satellite communications systems. In satellite systems, atmospheric disturbances and antenna imperfections are caused for the aforesaid polarization change.

Since linearly polarized waves, after conversion to elliptically polarized waves, no longer have their original polarizations, they cannot be properly detected by the receivers of the respective system in which they are propagating. As a result, loss of signal occurs and crosstalk is generated, thereby generally degrading system performance.

Where a single wave is transmitted within a system which is subject to the aforesaid polarization conversion, the prior art has been successful in providing apparatus for reconverting the resultant elliptically polarized wave back to a wave having a linear polarization. Typically, this is accomplished by applying a 90° phase delay along either the minor or major axis of the elliptically polarized wave. Such a delay brings the components along the two axes into phase with one another and, thus, results in a linearly polarized wave.

While the above-mentioned prior art arrangements have proved successful in the case of systems in which a single polarized wave is propagating, the problem becomes much more difficult to solve in cases where two orthogonally polarized waves at the same frequency are simultaneously transmitted. In such dual polarization systems, each linearly polarized wave is converted to an elliptically polarized wave. Moreover, the resultant elliptically polarized waves follow different elliptical paths which are nonorthogonal, i.e., different paths whose major axes are not at right angles. As a result, simply applying a 90 degree phase shift along the major or minor axis of one of the elliptical waves, as was done in the prior art, will linearize that one wave, but will now linearize the other elliptical wave. Thus, conversion of the two nonorthogonal elliptically polarized waves back to two linearly polarized waves cannot be satisfactorily accomplished employing prior art techniques.

It is, therefore, a broad object of the present invention to provide an arrangement for transforming two nonorthogonal elliptically polarized waves into two linearly polarized waves.

It is another object of the present invention to transform two nonorthogonal elliptically polarized waves into two orthogonal linearly polarized waves.

SUMMARY OF THE INVENTION

In accordance with the principles of the present invention, realization of the above and other objectives results, in part, from the recognition that there is a set of orthogonal directions for which the components of the first elliptically polarized wave lying therealong and the components of the second elliptically polarized wave lying therealong have the same phase difference. Thus, by applying a phase shift along at least one of the orthogonal directions to cancel this phase difference, the components of the first elliptical wave as well as those of the second elliptical wave are brought into phase with one another. As a result, both waves are linearized simultaneously.

In order to orthogonalize the two resultant linearly polarized waves means are provided for attenuating the components of each linear wave which lie along appropriate directions. More particularly, if the angle between the two resultant linear waves is less than 90 degrees, attenuation is applied along a direction defined by the bisector of the latter angle. If the angle is more than 90 degrees, attenuation is applied along a direction orthogonal to the aforesaid bisector direction.

BRIEF DESCRIPTION OF THE DRAWINGS

A clearer understanding of the above-mentioned objectives and features of the present invention can be obtained by reference to the following detailed description taken in conjunction with the accompanying drawings in which.

DETAILED DESCRIPTION

Prior to beginning a discussion of the present invention, a review of certain well-known waveguide principles which will be referred to hereinabove and which are described by G. C. Southworth in his textbook "-Principles and Applications of Waveguide Transmission," (1950), will now be presented. As discussed on pages 325–335 of the latter text, one way in which a circular waveguide can be readily adapted to provide a delay (i.e., phase-shift) to waves propagating therein is by inserting within the guide a thin, elongated member having a relatively high dielectric constant. The waveguide can additionally be made to delay only waves of a specific polarization by suitably selecting the relative dimensions and orientation of the inserted member. More specifically, by selecting the member to be thin (i.e., to have a thickness substantially less than its length and width) and inserting it in the guide with its plane (i.e., the plane defined by its length and width dimensions) parallel to a particular radial plane of the waveguide, the guide will affect only waves having a plane of polarization parallel to the particular radial plane.

In the above-described case, the shape of the inserted member takes the form of a thin plate or fin, with the plane of the plate being parallel to the polarization plane of the waves to be delayed. The particular amount of delay received by the latter waves as a result of such a plate is of course readily controllable (once the dielectric constant is chosen) by varying the dimensions (i.e., thickness, width and length) of the plate. Thus, any particular value of delay can be realized by suitable adjustment of the plate dimensions. Moreover, such adjustment can be readily carried out employing empirical techniques.

Figure 1:
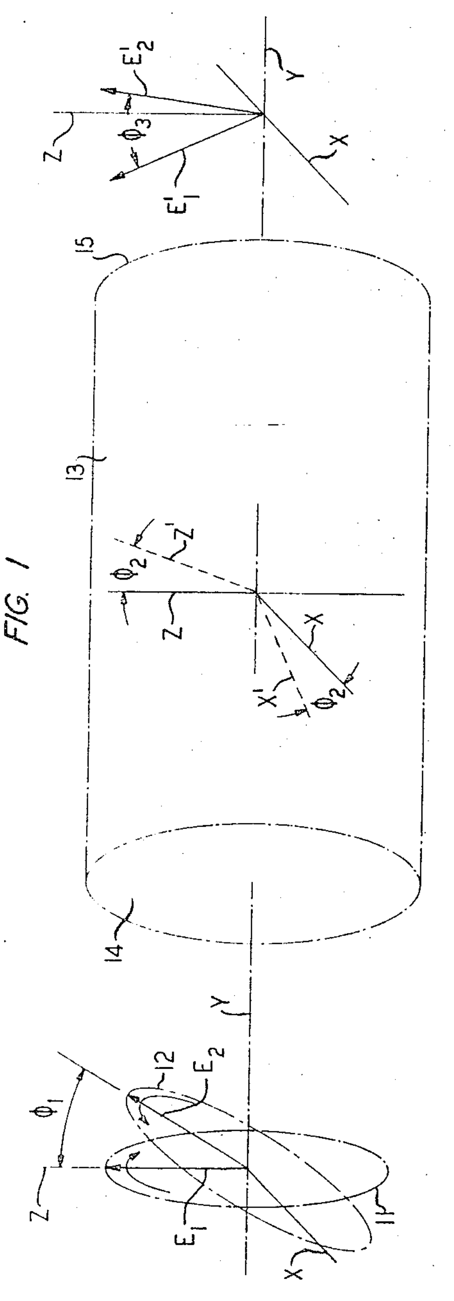
FIG. 1 shows an arrangement for transforming two nonorthogonal elliptically polarized waves into two linearly polarized waves, in accordance with the principles of the present invention.

Having briefly outlined some of the waveguide principles which will be referred to in the discussion to follow, attention is directed to FIG. 1. FIG. 1 shows apparatus for transforming two nonorthogonal elliptically polarized waves into two linearly polarized waves, in accordance with the principles of the present invention. A first elliptically polarized wave, illustrated as rotating in a clockwise direction, is represented by the electric field vector $E_1$. As shown, $E_1$ traces out an elliptical path 11 which lies in the $x$, $z$ plane of reference coordinate system $x$, $y$, $z$. The $E_1$ polarization is at its maximum amplitude when parallel to the $z$ direction and is at its minimum amplitude when parallel to the $x$ direction. The latter two directions, therefore, define the major and minor axes, respectively, of elliptical path 11.

A second elliptically polarized wave, shown as rotating in a counter-clockwise direction, is represented by the electric field vector $E_2$. This polarization also lies in the $x,z$ plane, but it follows a second elliptic path 12, the latter path having major and minor axes which are rotated clockwise by an angle $\phi_1$ relative to the respective major and minor axes of path 11. The maximum and minimum amplitude positions of $E_2$, thus are also rotated clockwise by the angle $\phi_1$ relative to the maximum and minimum amplitude positions, respectively, of $E_1$. The axial ratios of the elliptical waves $E_1$ and $E_2$ will be represented hereinbelow by the parameters $A_1$ and $A_2$, respectively. As used herein the term axial ratio is defined as the magnitude of the ratio of the minor to major axis for clockwise rotating elliptical waves and the negative of the latter magnitude for counter-clockwise rotating elliptical waves. It is important to note also that the rotation directions depicted for $E_1$ and $E_2$ are merely illustrative, and that the principles of the invention are intended to apply when the two polarizations are rotating in the same direction as well as when they are rotating in opposite directions.

The two elliptically polarized $E_1$ and $E_2$ are coupled into a waveguide section 13, illustrated herein as being of circular cross section, through an input port 14. Waveguide section 13 is adapted to delay waves passing therethrough polarized in a first direction, illustratively depicted in FIG. 1 as the $x'$ direction, by a specified amount relative to waves traversing therethrough polarized in a second direction, orthogonal to the first direction. The aforesaid second direction is illustrated as the $z'$ direction in FIG. 1.

In accordance with the invention, the orthogonal set of directions $x'$ and $z'$ are the directions for which the components of the elliptical polarization $E_1$ lying therealong have the same relative phase delay as the respectively parallel components of the elliptical polarization $E_2$, that is, the directions are such that the component of each polarization lying in the $z'$ direction is delayed an amount $\Delta\phi$ relative to the other component of that polarization lying in the $x'$ direction. Additionally, in accordance with the invention, the amount of delay introduced by waveguide 13 along the $x'$ direction is selected to be equal to the relative delay $\Delta\phi$. When traversing guide 13, therefore, the components of the $E_1$ and $E_2$ polarizations along the $x'$ direction are delayed by an amount $\Delta\phi$ relative to the components of these waves lying along the $z'$ direction. As a result, the original phase delay between the components of each wave is canceled. Since the components of each polarization are now in-phase with one another, they sum to a linearly polarized wave. Thus, as shown, the two applied waves $E_1$ and $E_2$ exit guide 13, through an output port 15, as two linearly polarized waves $E_1'$ and $E_2'$, respectively.

Waveguide 13 can be adapted to provide the required delay in any conventional manner. Thus, such adaptation might take the form described in the portions of the Southworth textbook "Principles and Applications of Waveguide Transmission," discussed above. More specifically, as above-indicated, a thin, elongated dielectric plate having a relatively high dielectric constant might be inserted within guide 13 such that the plane of the plate is parallel to the polarization direction of the waves to be delayed (i.e. parallel to the $x'-y$ plane in the present illustrative case). The guide will thus introduce a delay primarily to the aforesaid waves. The latter delay can then be made equal to the required value $\Delta\phi$ by suitably adjusting the plate dimensions, in the manner described in the above discussion. Alternatively, the required delay can be produced by inserting a rod or rods of specified length into the wall of the guide. A thorough discussion of the latter technique can also be found in the aforesaid Southworth text.

While, in the embodiment of FIG. 1, waves $E_1$ and $E_2$ were linearized by adapting guide 13 to delay waves polarized in the $x'$ direction relative to those in the $z'$ direction, it is readily apparent that a similar result could have likewise been achieved by adapting waveguide 13 to advance the phase of waves polarized in the $z'$ direction relative to those in the $x'$ direction by an amount $\Delta\phi$. Waveguide 13 can be adapted to provide such a phase advance by reducing the dimensions of the guide along the $x'$ direction, as for example, by squeezing the guide therealong. Such a technique is also disclosed in the above-cited Southworth textbook.

Having discussed the operation of waveguide section 13, the functional or design relationships relating the delay $\Delta\phi$, and the angle $\phi_2$ (i.e., the angle, measured in a clockwise sense, defining the orientation of the $x'$, $z'$ axes relative to the x, z axes), to the parameters of the waves $E_1$ and $E_2$ (i.e., the parameters $\phi_1$, $A_1$ and $A_2$) will now be given. It can be shown that the ratios of the $x'$ and $z'$ components of the $E_1$ polarization and the $E_2$ polarization are given, respectively, by $$r_1=[(1-q_1)/(1+q_1)]\ e^{-j\pi/2} \qquad (1)$$

$$r_2=[(1-q_2)/(1+q_2)]\ e^{-j\pi/2} \qquad (2)$$

where $$q_1=[(1+A_1)/(1-A_1)]\ e^{-j2\phi_2} \qquad (3)$$

and $$q_2=[(1+A_2)/(1-A_2)]\ e^{-j2(\varphi_2-\varphi_1)} \qquad (4)$$

$$\Delta\phi=\angle r_1 \qquad (5)$$

$$\angle r_1=\angle r_2 \text{ or } \angle r_1+\pi=\angle r_2 \qquad (6);$$

Substituting equation 3 into equation 1 and simplifying we have $$\phi\Delta=\tan^{-1}[(2A_1)/(1-A_1^2)(\sin 2\phi_2)] \qquad (7)$$

$$\text{where } 0<\Delta\phi<\pi \text{ when } A_1>0 \qquad (8)$$

and $$-(\pi/2)<\Delta\phi<(\pi/2) \text{ when } \sin 2\phi_1>0 \qquad (9)$$

Equation 6 above is equivalent to $$\tan\ \angle r_1=\tan\ \angle r_2 \qquad (10)$$

Substituting equations 1, 2, 3 and 4 into equation 7 and simplifying results in $$-\varphi_2=\frac{1}{2}\cot^{-1}\left[\frac{\cos 2\varphi_1-\dfrac{A_2\ (1-A_1^2)}{A_1\ (1-A_2^2)}}{\sin 2\varphi_1}\right] \qquad (11)$$

where $$0<\phi_2<(\pi/2) \qquad (12)$$

Equation 11 above relates the angle $\phi_2$ to the parameters $\phi_1$, $A_1$, and $A_2$ of the polarization $E_1$ and $E_2$ and the latter equation in combination with equation 7 relates the parameters of the polarizations to the delay $\Delta\phi$. By adapting guide 13 to provide a delay in conformity with these relationships, the guide will operate to transform elliptically polarized waves into two linearly polarized waves, as hereinabove explained.

while the apparatus of FIG. 1 enables the conversion of elliptically polarized waves into linearly polarized waves, the resultant linear polarizations are not necessarily orthogonal. In some system applications, as for example, where the waves initially transmitted where two orthogonal linear polarizations, it might be required to transform the two elliptical polarizations into two orthogonal linear polarizations. In such cases, the embodiment of FIG. 2 can be employed. In this embodiment, additional means are provided to orthogonalize the two linearly polarized waves generated by guide 13.

Figure 2:
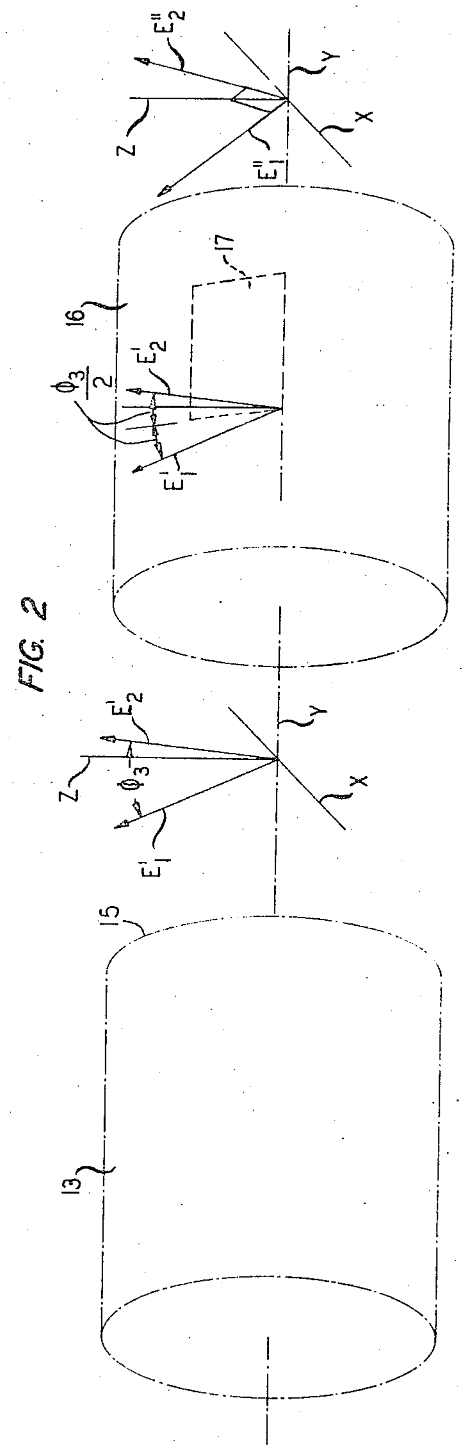
FIG. 2 illustrates a modification of the embodiment of FIG. 1 in which additional means are provided for orthogonalizing the produced linearly polarized waves.

As shown in FIG. 2, a second waveguide section 16, also depicted as being of circular cross-section, is disposed to receive the linearly polarized waves exiting from output port 15 of waveguide 13. Included within waveguide 16 is an attenuator which introduces attenuation of an appropriate magnitude to waves propagating in the guide polarized along a specified direction. The latter attenuator is illustratively shown in FIG. 2 as being a resistance card 17.

The orientation of card 17 within guide 16, relative to the orientations of the polarizations $E_1'$ and $E_2'$, depends upon the angle $\phi_3$ between the two polarizations. If $\phi_3$ is less than 90°, card 17 is positioned such that it is parallel to the bisector of $\phi_3$. On the other hand, if the angle $\phi_3$ is greater than 90°, the card is placed parallel to a direction which is orthogonal to the aforesaid bisector direction.

In the first case, when card 17 is disposed parallel to the bisector, the card attenuates the components of $E_1'$ and $E_2'$ which lie therealong and, thus, produces two resultant waves which have a greater angle therebetween. By selecting the magnitude of the attenuation to be equal to the tan $(\phi_3/2)$, the angle between the resultant polarizations is increased to 90°. In the second case, when the card is disposed orthogonal to the bisector, the components of $E_1'$ and $E_2'$ lying along that direction are reduced. Thus, in this instance, the two waves produced have a smaller angle therebetween. Selecting the attenuation of the card in this case to be equal to the cot )$\phi_3$ /2) decreases the angle between the resultant waves to 90°.

In FIG. 2, for purposes of illustration, it has been assumed that $\phi_3$ is less than 90°. Thus, as shown, card 17 is placed in a direction parallel to the bisector of $\phi_3$. By selecting the attenuation of card 17 to be equal to tan $(\phi_3/2)$, as hereinabove explained, the two nonorthogonal waves $E_1'$ and $E_2'$ are transformed into two orthogonal waves, $E_1''$ and $E_2''$, respectively, the latter two waves being shown as exiting from guide 16.

As in the case of the angle $\phi_2$ and the delay $\Delta\phi$, the angle $\phi_3$ is also related to the parameters of $E_1$ and $E_2$. In particular, it can be shown that $\phi_3$ is given $$-\varphi_3=\tan^{-1}\left[\frac{(1+A_1^2)-(1-A_1^2)\ \cos 2\varphi_2}{(1+A_1^2)+(1-A_1^2)\ \cos 2\varphi_2}\right] \mp\tan^{-1}\left[\frac{(1+A_2^2)-(1-A_2^2)\ \cos 2(\varphi_2-\varphi_1)}{(1+A_2^2)+(1-A_2^2)\ \cos 2(\varphi_2-\varphi_1)}\right] \qquad (13)$$

where the first and second terms in the above equation are the angles between the $z'$ axis and the $E_1'$ and $E_2'$ polarizations, respectively and where the latter terms are subtracted (i.e., the negative sign governs) when the first expression in equation (6) is satisfied and added (i.e., the positive sign governs) when the second expression in equation (6) is satisfied.

The discussion of the embodiment of FIGS. 1 and 2 was primarily concerned with the transformation of two elliptically polarized waves into two linearly polarized waves. In certain situations, however, as for example, where the elliptical waves result from the distortion of two oppositely rotating circularly polarized waves, it may be required to convert the elliptical waves back to their original circular polarizations. In accordance with the present invention, such transformation can be realized by modifying the embodiment of FIG. 2 to include a 90° phase shifter at the output end of waveguide section 16.

Figure 3:
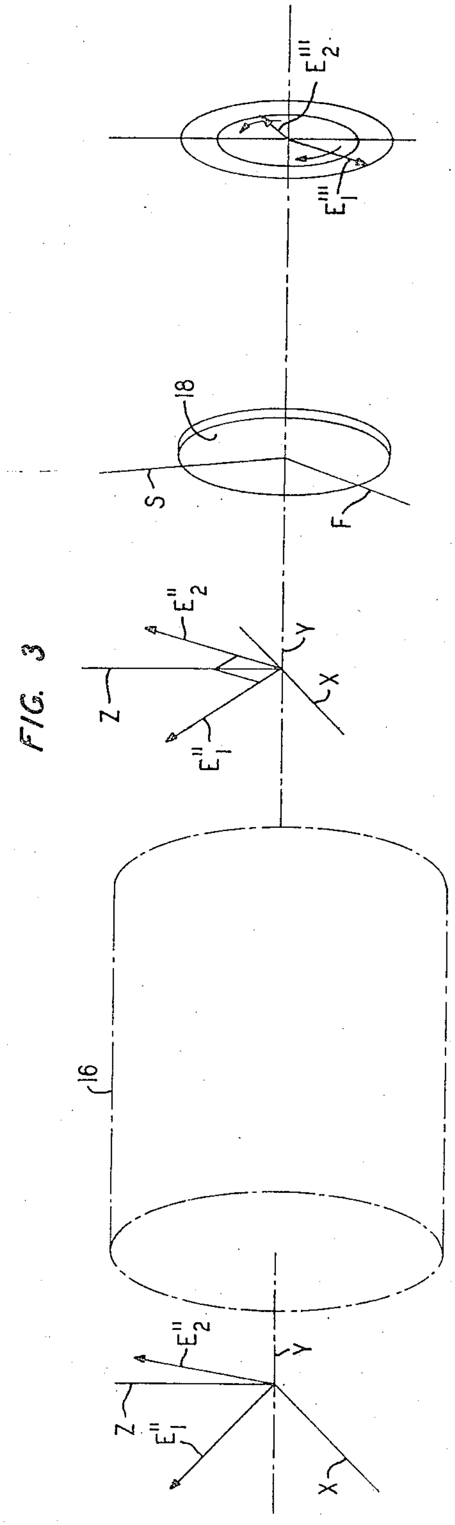
FIG. 3 illustrates a modification of the embodiment of FIG. 2 in which additional phase shift means is provided for converting the two orthogonal linearly polarized waves into two oppositely rotating circularly polarized waves.

As shown in FIG. 3, a 90° phase shifter, illustratively depicted as a quarter wave plate 18, is disposed to receive the orthogonally polarized waves $E_1''$ and $E_2''$ exiting from waveguide 16. Plate 18 is arranged such that it delays waves polarized in the direction of the bisector of the angle between waves $E_1''$ and $E_2''$ by 90 degrees relative to waves polarized normal to the bisector (i.e., with its slow axis $s$ parallel to the bisector and its fast axis $f$ normal thereto). As a result, upon passage through plate 13, the component of each wave along the bisector direction is shifted 90° out of phase with respect to its corresponding component orthogonal to the bisector. Since the corresponding components of each wave are of equal magnitude, but 90° out of phase, they sum to a circularly polarized wave. Thus, as shown, waves $E_1''$ and $E_2''$, are converted by plate 18 into two circularly polarized waves $E_1'''$ and $E_2'''$, respectively, the former wave rotating in a clockwise direction and the latter in a counter-clockwise direction.

In all cases, it is to be understood that the above-described arrangements are simply illustrative of the many possible specific embodiments which represent applications of the present invention. Numerous and varied other arrangements can be readily devised in accordance with these principles without departing from the spirit and scope of the invention. For example, instead of employing waveguides having circular cross-sections for guides 13 and 16, waveguides having rectangular or square cross-sections could have been used.

What is claimed is:

1. Polarization transformation apparatus for transforming first and second nonorthogonal elliptically polarized waves into first and second linearly polarized waves comprising:

an input port into which said first and second elliptically polarized waves are coupled;

an output port out of which said first and second linearly polarized waves are coupled;

and waveguide means connecting said input and output ports, said waveguide means being adapted to apply a phase shift along at least one of two orthogonal directions to cancel the phase difference between the components of each of said first and second elliptically polarized waves lying therealong, said orthogonal directions being those for which the phase difference between the components of said first elliptically polarized wave lying therealong is equal to the phase difference between the components of said second elliptically polarized wave lying therealong.

2. Apparatus in accordance with claim 1 which includes, in addition, attenuation means coupled to said output port for orthogonalizing said first and second linearly polarized waves coupled therefrom.

3. Polarization transformation apparatus for transforming first and second nonorthogonal elliptically polarized waves into first and second linearly polarized waves comprising:

an input port into which said first and second elliptically polarized waves are coupled;

an output port out of which said first and second linearly polarized waves are coupled;

and a first waveguide means connecting said input and output ports, said waveguide means being adapted to shift the phase of waves polarized in a first direction relative to waves polarized in a direction orthogonal to said first direction by an amount equal to the phase of the component of said first elliptically polarized wave in said orthogonal direction less the phase of the component of said first elliptically polarized wave in said first direction, said directions being those for which the phase difference between the components of said first elliptically polarized wave in said directions is equal to the phase difference between the components of said second elliptically polarized wave in said directions.

4. Apparatus in accordance with claim 3 in which the major axis of said second elliptically polarized wave is rotated by an angle $\phi_1$, measured in a clockwise sense, relative to the major axis of said first elliptically polarized wave.

5. Apparatus in accordance with claim 4 in which said first direction is rotated by an angle $\phi_2$, measured in a clockwise sense, relative to the major axis of said first wave, where $\phi_2$ is given by $$\varphi_2=\frac{1}{2}\cot^{-1}\left[\frac{\cos 2\varphi_1-\frac{A_2\ (1-A_1^2)}{A_1\ (1-A_2^2)}}{\sin 2\varphi_1}\right]$$

for $$0 < \phi_2 < \pi/2$$

and $A_1$ is the ratio of the minimum to maximum amplitudes of said first elliptically polarized wave and $A_2$ is the ratio of the minimum to maximum amplitudes of said second elliptically polarized wave.

6. Apparatus in accordance with claim 5 in which the phase difference $\Delta\phi$ between the components of said first wave in said direction is given as $$\Delta\phi = \tan^{-1}\left[(2A_1)/(1-A_1^2)(\sin 2\phi_2)\right]$$

where $0 < \Delta\phi < \pi$ when $A_1 > 0$
and $-(\pi/2) < \Delta\phi < (\pi/2)$ when $\sin 2400_1 >$ 7. Apparatus in accordance with claim 3 which includes, in addition, a second waveguide means disposed to receive the two linearly polarized waves coupled form said output port, said second waveguide means being adapted to orthogonalize said two linearly polarized waves.

8. Apparatus in accordance with claim 7 in which said second waveguide means includes attenuation means for providing attenuation such that said two linearly polarized waves are caused to have an angle therebetween substantially equal to 90°.

9. Apparatus in accordance with claim 8 in which said attenuation means is a resistance card.

10. Apparatus in accordance with claim 8 in which said attenuation means provides attenuation of magnitude $\tan(\phi_3/2)$ along a direction defined by the bisector of the angle $\phi_3$, where $\phi_3$ is the angle between the two linearly polarized waves when coupled from said output port and is less than 90°.

11. Apparatus in accordance with claim 8 in which said attenuation means provides attenuation of magnitude $\cot(\phi_3/2)$ along a direction defined by the normal to the bisector of the angle $\phi_3$, where $\phi_3$ is the angle between the two linearly polarized waves when coupled from said output port and is greater than 90° but less than 180°.

12. Apparatus in accordance with claim 7 which includes additional phase shift means for receiving said two orthogonal linearly polarized waves and applying a 90° phase shift along the bisector of the angle between said orthogonal waves.

13. Apparatus in accordance with claim 12 in which said phase shift means is a quarter wave plate.

* * * * *